United States Patent
Sun

(10) Patent No.: US 11,088,901 B2
(45) Date of Patent: Aug. 10, 2021

(54) REFERENCE SIGNAL INDICATION METHOD, NETWORK DEVICE AND TERMINAL DEVICE

(71) Applicant: VIVO MOBILE COMMUNICATION CO., LTD., Chang'an Dongguan (CN)

(72) Inventor: Xiaodong Sun, Chang'an Dongguan (CN)

(73) Assignee: Vivo Mobile Communication Co., Ltd., Chang'an Dongguan (CN)

( * ) Notice: Subject to any disclaimer, the term of this patent is extended or adjusted under 35 U.S.C. 154(b) by 35 days.

(21) Appl. No.: 16/476,143

(22) PCT Filed: Dec. 29, 2017

(86) PCT No.: PCT/CN2017/119817
§ 371 (c)(1),
(2) Date: Jul. 5, 2019

(87) PCT Pub. No.: WO2018/127000
PCT Pub. Date: Jul. 12, 2018

(65) Prior Publication Data
US 2019/0356540 A1    Nov. 21, 2019

(30) Foreign Application Priority Data
Jan. 5, 2017   (CN) .......................... 201710008003.3

(51) Int. Cl.
*H04L 12/24* (2006.01)
*H04W 76/27* (2018.01)
*H04L 5/00* (2006.01)

(52) U.S. Cl.
CPC ........ *H04L 41/0803* (2013.01); *H04L 5/0048* (2013.01); *H04W 76/27* (2018.02)

(58) Field of Classification Search
CPC . H04L 41/0803; H04L 5/0048; H04L 5/0091; H04L 5/00; H04L 5/0067; H04W 76/27; H04W 72/04
See application file for complete search history.

(56) References Cited

U.S. PATENT DOCUMENTS

2010/0149971 A1   6/2010   Noriega
2010/0322100 A1* 12/2010   Wan ..................... H04B 7/0413
                                                            370/252
(Continued)

FOREIGN PATENT DOCUMENTS

CN    102469589 A    5/2012
CN    102625354 A    8/2012
(Continued)

OTHER PUBLICATIONS

1st Chinese Office Action for Chinese Application No. 201710008003.3, dated Apr. 23, 2020 (Apr. 23, 2020)—8 pages (English translation—9 pages).

(Continued)

*Primary Examiner* — Jae Y Lee
(74) *Attorney, Agent, or Firm* — Culhane Meadows PLLC; Stephen J. Weed

(57) ABSTRACT

A reference signal indication method, a network device and a terminal device are provided. The method includes: configuring a target reference signal pattern to be used for a terminal device in later transmission occasions, wherein the target reference signal pattern is a reference signal pattern selected from multiple predefined reference signal patterns; and not transmitting reference signal indication information to the terminal device, in a case that the target reference signal pattern is a default reference signal pattern; or not transmitting the reference signal indication information to the terminal device, in a case that the target reference signal (Continued)

pattern is the same as a reference signal pattern indicated by a previous piece of reference signal indication information.

20 Claims, 6 Drawing Sheets

(56) References Cited

U.S. PATENT DOCUMENTS

| | | | |
|---|---|---|---|
| 2013/0028211 | A1 | 1/2013 | Li et al. |
| 2013/0223332 | A1 | 8/2013 | Wu et al. |
| 2014/0241199 | A1 | 8/2014 | Chun et al. |
| 2015/0288483 | A1 | 10/2015 | Sun et al. |
| 2015/0289235 | A1 | 10/2015 | Park et al. |
| 2015/0373694 | A1* | 12/2015 | You ............... H04L 5/0094 370/329 |
| 2016/0073239 | A1 | 3/2016 | Guo et al. |
| 2016/0087774 | A1 | 3/2016 | Guo et al. |
| 2017/0332264 | A1 | 11/2017 | Mo et al. |
| 2018/0007708 | A1* | 1/2018 | Ke ............... H04L 27/0006 |

FOREIGN PATENT DOCUMENTS

| | | | |
|---|---|---|---|
| CN | 103179667 | A | 6/2013 |
| CN | 103313391 | A | 9/2013 |
| CN | 103959692 | A | 7/2014 |
| CN | 104113914 | A | 10/2014 |
| CN | 104125186 | A | 10/2014 |
| CN | 104980247 | A | 10/2015 |
| CN | 105636108 | A | 6/2016 |
| EP | 2763339 | A1 | 8/2014 |

OTHER PUBLICATIONS

Ericsson: IC Friendliness vs Configurable DMRS—#R1-167744; 3GPP TSG-RAN WG1 #86, Aug. 22, 2016, 'Gothenburg, Sweden, 2 pages.
Extended European Report for European Application No. 178906095, dated Dec. 20, 2019 (Dec. 20, 2019)—8 pages.
Ericsson: Physical Layer Aspects for PDSCH for Short TTI—#R1-163318; 3GPP TSG RAN WG1 Meeting #84bis, Apr. 11, 2016, Busan, 3 pages.
International Search Report and Written Opinion for International Application No. PCT/CN2017/119817, dated Jul. 18, 2019 (Jul. 18, 2019)—10 pages (English translation—7 pages).
Nokia, Alcatel-Lucent Shanghai Bell: On Details of Flexible DMRS Design for 2-Symbol DL Shorter TTI—#R1-1612212; 3GPP TSG RAN WG1 Meeting #87, Nov. 14, 2016, Reno, Nevada, USA, 3 pages.
Search Report for Chinese Application No. 201710008003.3, dated Apr. 15, 2017 (Apr. 15, 2017)—7 pages (English translation—5 pages).
2nd Chinese Office Action for Chinese Application No. 201710008003.3, dated Oct. 15, 2020 (Oct. 15, 2020)—5 pages (English translation—5 pages).

* cited by examiner

REFERENCE SIGNAL INDICATION METHOD, NETWORK DEVICE AND TERMINAL DEVICE

CROSS-REFERENCE TO RELATED APPLICATION

This application is a U.S. national phase application of a PCT Application No. PCT/CN2017/119817 filed on Dec. 29, 2017, which claims a priority of a Chinese patent application No. 201710008003.3 filed in China on Jan. 5, 2017, the disclosure of which is incorporated herein in its entirety by reference.

TECHNICAL FIELD

The present disclosure relates to a field of communication technology, and in particular, relates to a reference signal indication method, a network device and a terminal device.

BACKGROUND

In a conventional Long Term Evolution (LTE) system, a reference signal is used for channel estimation and channel measurement of a traffic channel and a control channel. In a forthcoming fifth generation (5G) mobile communication system, a reference signal pattern may dynamically be changed with scene requirements such as different services, numerical configurations, De-modulation Reference Signal (DMRS) functions, and needs to be indicated through specific control information. However, the reference signal pattern may be changed dynamically and frequently, causing significant signaling indication overheads and thus lowering service transmission rates. For example, the DMRS is mainly used for demodulation of the traffic channel and the control channel. Through designing a fixed DMRS pattern both in a time domain and in a frequency domain, a DMRS pattern may be used for the channel estimation of a system. The DMRS pattern is related to a transmission mode. DMRS patterns corresponding to different transmission modes may be different. Therefore, the DMRS pattern does not need to be indicated by additional high-layer Radio Resource Control (RRC) signalings and/or physical-layer Downlink Control Indicator (DCI) information.

In the forthcoming 5G mobile communication system, the DMRS may be used for not only the demodulation of the traffic channel and the control channel but also be used for the channel measurement. The DMRS pattern may be dynamically changed with the scene requirements such as the different services, the numerical configurations, the DMRS functions. Therefore, the DMRS pattern needs to be indicated through the specific control information. Additionally, since in the forthcoming 5G mobile communication system, the DMRS pattern may be changed dynamically and frequently, the significant signaling indication overheads may be brought out, thus causing the service transmission rate to be lowered.

SUMMARY

A reference signal indication method, a network device and a terminal device are provided in the embodiments of the present disclosure, so as to address technical problems that a bit overhead for the system is large and a service transmission rate is low due to a dynamic change of reference signal patterns in the related art.

In a first aspect, a reference signal indication method applied to a network device is provided in the embodiments of the present disclosure. The method includes: configuring a target reference signal pattern to be used for a terminal device in later transmission occasions, wherein the target reference signal pattern is a reference signal pattern selected from multiple predefined reference signal patterns; and not transmitting reference signal indication information to the terminal device, in a case that the target reference signal pattern is a default reference signal pattern; or not transmitting the reference signal indication information to the terminal device, in a case that the target reference signal pattern is the same as a reference signal pattern indicated by a previous piece of reference signal indication information.

In a second aspect, a reference signal indication method applied to a terminal device is provided in the embodiments of the present disclosure. The method includes: receiving reference signal indication information transmitted by a network device, wherein, the reference signal indication information is used to indicate a target reference signal pattern to be used in later transmission occasions, and the target reference signal pattern is a reference signal pattern selected from multiple predefined reference signal patterns; and in a case that the reference signal indication information is not received, determining the target reference signal pattern to be a default reference signal pattern, and transmitting corresponding reference signals in transmission resources corresponding to the default reference signal pattern; or in a case that the reference signal indication information is not received, determining the target reference signal pattern to be a reference signal pattern indicated by a previous piece of reference signal indication information received by the terminal device, and transmitting corresponding reference signals in transmission resources corresponding to the reference signal pattern indicated by the previous piece of reference signal indication information received by the terminal device.

A third aspect, a network device is provided in the embodiments of the present disclosure, and includes: a configuration module, configured to select a target reference signal pattern to be used for a terminal device in later transmission occasions, wherein the target reference signal pattern is a reference signal pattern selected from multiple predefined reference signal patterns; a first processing module, configured to not transmit reference signal indication information to the terminal device in a case that the target reference signal pattern is a default reference signal pattern; or a second processing module, configured to not transmit the reference signal indication information to the terminal device in a case that the target reference signal pattern is the same as a reference signal pattern indicated by a previous piece of reference signal indication information.

In a fourth aspect, a terminal device is provided in the embodiments of the present disclosure, and includes: a reception module, configured to receive reference signal indication information transmitted by a network device, wherein, the reference signal indication information is used to indicate a target reference signal pattern to be used in later transmission occasions, and the target reference signal pattern is a reference signal pattern selected from multiple predefined reference signal patterns; a third processing module, configured to, in a case that the reference signal indication information is not received, determine the target reference signal pattern to be a default reference signal pattern, and transmit corresponding reference signals in transmission resources corresponding to the default reference signal pattern; or a fourth processing module, configured to, in a case that the reference signal indication information is not received, determine the target reference signal pattern to be a reference signal pattern indicated by a previous piece of reference signal indication information received by the terminal device, and transmit corresponding reference signals in transmission resources corresponding to the reference signal pattern indicated by the previous piece of reference signal indication information received by the terminal device.

In a fifth aspect, a network device is provided in the embodiments of the present disclosure, and includes: a storage, a processor, and computer programs stored on the storage and executable on the processor, wherein, when the processor executes the computer programs, the processor implements steps of the reference signal indication method according to the first aspect of the present disclosure.

In a sixth aspect, a terminal device is provided in the embodiments of the present disclosure, and includes: a storage, a processor, and computer programs stored on the storage and executable on the processor, wherein, when the processor executes the computer programs, the processor implements steps of the reference signal indication method according to the second aspect of the present disclosure.

In a seventh aspect, a computer readable storage medium is provided in the embodiments of the present disclosure and includes computer programs stored on the computer readable storage medium, wherein when the computer programs are executed by a processor, the processor implements steps of the reference signal indication method of the present disclosure.

In this way, beneficial effects of the embodiments of the present disclosure are as follow. The network device does not transmit the reference signal indication information in case of using the default reference signal pattern or using the same reference signal pattern as that used in the previous transmission occasions in the later transmission occasions, so that the transmission times of system information are reduced under a premise that a reference signal pattern is accurately indicated, thereby reducing a bit overhead for the system information and increasing a service transmission rate.

BRIEF DESCRIPTION OF THE DRAWINGS

In order to more clearly illustrate technical solutions of embodiments of the present disclosure, drawings used in description of the embodiments of the present disclosure will be briefly discussed hereinafter. Obviously, following figures in the description only relate to some of the embodiments of the present disclosure, and one skilled in the art may derive other figures based on these figures without paying any creative labor.

DETAILED DESCRIPTION

Figure 1:
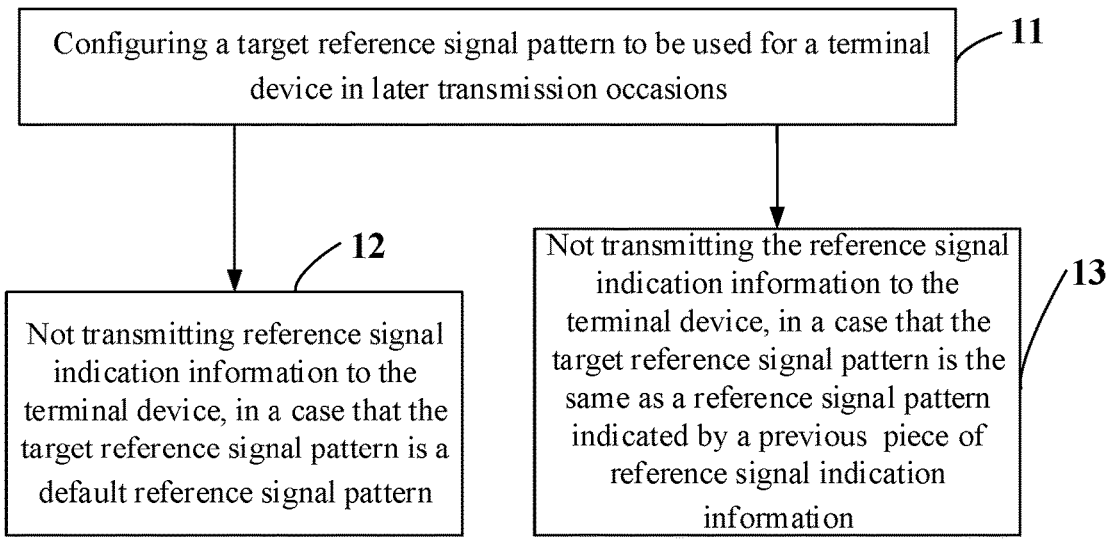
FIG. 1 is a flowchart of a reference signal indication method in some embodiments of the present disclosure.

Exemplary embodiments of the present disclosure will be described in details hereinafter in conjunction with drawings. Although the exemplary embodiments are shown in the drawings, it should be understood that the embodiments of the present disclosure may be implemented in various ways, and the present disclosure is not limited by the embodiments described herein. On the contrary, these embodiments of the present disclosure are provided for sake of understanding the present disclosure more thoroughly, and conveying the scope of the present disclosure to one of ordinary skills in the art completely.

In some optional embodiments, a reference signal indication method at a network device side may be described briefly in this embodiment in combination with the drawings. Specifically, referring to FIG. 1, some embodiments of the present disclosure provide a reference signal indication method. The reference signal indication method includes following steps 11-13.

Step 11: configuring a target reference signal pattern to be used for a terminal device in later transmission occasions.

In the forthcoming fifth-generation (5G) mobile communication system, in order to satisfy the scene requirements such as different numerical configurations and dynamically-changed reference signal functions, reference signal patterns may be changed dynamically. Thus, in a scene having the same number of flows and the same beamforming, different reference signal patterns may also be designed. The target reference signal pattern to be used in the later transmission occasions is one selected from multiple different predefined reference signal patterns.

Step 12: not transmitting reference signal indication information to the terminal device, in a case that the target reference signal pattern is a default reference signal pattern.

In order to reduce transmission times of the reference signal indication information, the network device does not transmit the reference signal indication information to the terminal device in case of using the default reference signal pattern. That is, in order to reduce indication overheads brought due to dynamic changes of the reference signal pattern, the default reference signal pattern needs to be defined. In case of indication, the system uses the default reference signal pattern to receive or transmit signals. The above step 12 is a way for reducing the transmission times of the reference signal indication information. Another way for reducing the transmission times of the reference signal indication information is introduced below.

Step 13: not transmitting the reference signal indication information to the terminal device, in a case that the target reference signal pattern is the same as a reference signal pattern indicated by a previous piece of reference signal indication information.

In order to reduce the transmission times of the reference signal indication information, the network device does not transmit the reference signal indication information to the terminal device in a case that the reference signal pattern is not changed. That is, the target reference signal pattern is the same as a most recent reference signal pattern, until new indication information for indicating a change of reference signal patterns is received. In an example of using a most recent DMRS pattern, if the terminal device uses a k-th DMRS pattern to receive or transmit signals at a time t0 and the terminal device does not receive any information for indicating the change of the DMRS pattern between a time t0+1 and a time t0+p, then a User Equipment (UE) may receive and transmit signals using the k-th DMRS pattern from t0+1 to t0+p, until the indication information for indicating the change of the DMRS pattern is received at t0+p+1, and UE stops using the k-th DMRS pattern.

The network device in the embodiments of the present disclosure does not transmit the reference signal indication information in case of using the default reference signal pattern or using the same reference signal pattern as that used in the previous transmission occasions in the later transmission occasions, so that the transmission times of system information is reduced under a premise that a reference signal pattern is accurately indicated, thereby reducing a bit overhead for the system information and increasing a service transmission rate.

A brief introduction is made to the reference signal indication method of the present disclosure through some embodiments. The reference signal indication method is further described hereinafter in combination accompanying drawings and specific application scenarios.

Figure 2:
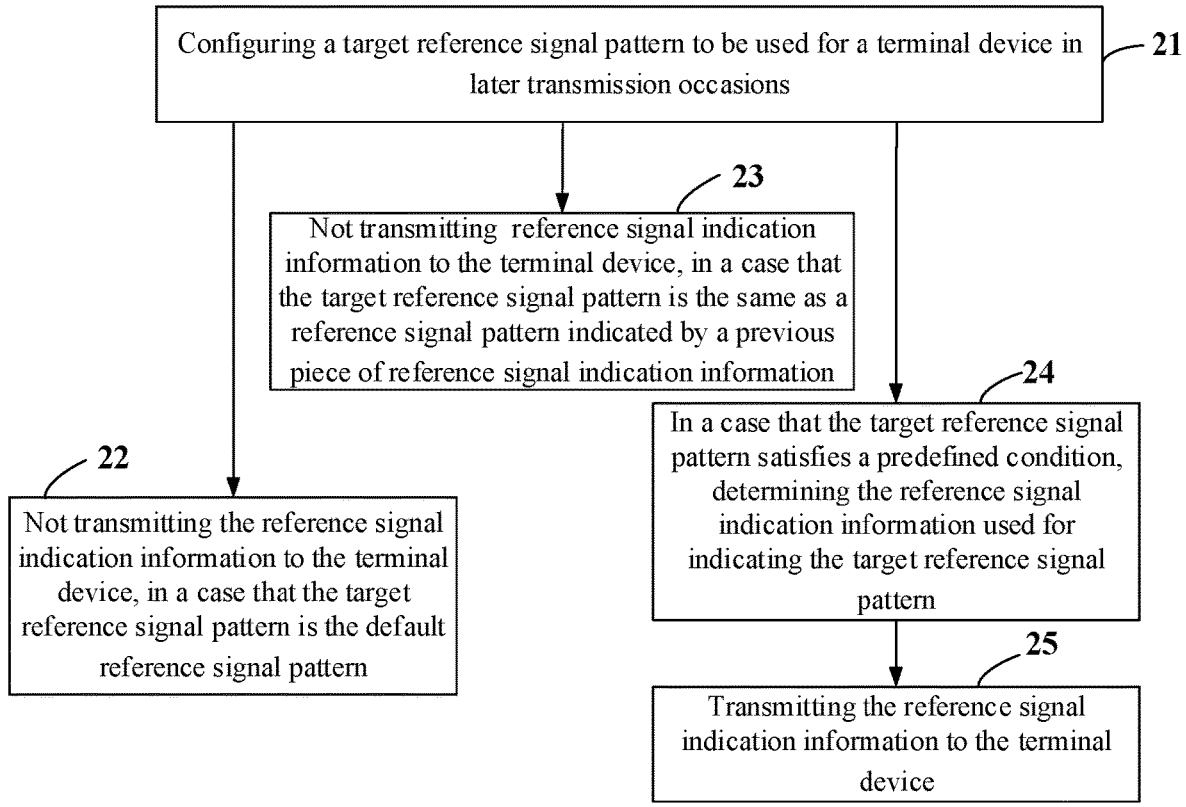
FIG. 2 is a flowchart of a reference signal indication method in some embodiments of the present disclosure.

Specifically, as shown in FIG. 2, the reference signal indication method provided in some embodiments of the present disclosure specifically includes following steps 21-25.

Step 21: configuring a target reference signal pattern to be used for a terminal device in later transmission occasions.

The target reference signal pattern to be used in the later transmission occasions is one selected from multiple different reference signal patterns.

The target reference signal pattern may be a Demodulation Reference Signal Pattern (DMRS pattern), a Channel-State-Information Reference Signal pilot pattern (CSI-RS pattern), a Phase Tracking Reference Signal pattern (PTRS pattern), or a Sounding Reference Signal pattern (SRS pattern). Reference signals may be divided into downlink reference signals and uplink reference signals. Correspondingly, the reference signal patterns may be grouped into downlink reference signal patterns and uplink reference signal patterns. The downlink reference signal patterns include the DMRS pattern, the CSI-RS pattern and the PTRS pattern; the uplink reference signal pattern includes the DMRS pattern, the SRS pattern and the PTRS pattern. Further, in a case that the network device successfully configures the target reference signal pattern to be used in the later transmission occasions, a transmission of the reference signal is performed by using transmission resources corresponding to the target reference signal pattern. The transmission above includes downlink transmission and uplink transmission. Specifically, in a case that the reference signal pattern is the downlink reference signal pattern, the network device performs transmission of the downlink reference signal by using transmission resources corresponding to the downlink reference signal pattern; in a case that the reference signal pattern is the uplink reference signal pattern, the terminal device performs transmission of the uplink reference signal by using transmission resources corresponding to the uplink reference signal pattern. The embodiment is illustrated by way of the DMRS pattern.

Step 22: not transmitting the reference signal indication information to the terminal device, in a case that the target reference signal pattern is the default reference signal pattern.

In order to reduce the transmission times of the reference signal indication information, the network device does not transmit the reference signal indication information to the terminal device in case of using the default reference signal pattern. That is, in order to reduce an overhead of a high-layer Radio Resource Control (RRC) signaling, a Medium Access Control (MAC) Control Element (CE) and/or physical-layer Downlink Control Indicator (DCI) information caused by the dynamic change of the DMRS pattern, the default DMRS pattern needs to be defined. In a case that the high-layer RRC signaling, the MAC CE and/or the physical-layer DCI information does not exist, the system uses the default DMRS pattern for transmitting or receiving signals.

Step 23: not transmitting the reference signal indication information to the terminal device, in a case that the target reference signal pattern is the same as a reference signal pattern indicated by the previous piece of reference signal indication information.

In order to reduce the transmission times of the reference signal indication information, the network device does not transmit the reference signal indication information to the terminal device in a case that the target reference signal pattern is the same as the reference signal pattern indicated by the previous piece of reference signal indication information, i.e., in a case that the target reference signal pattern is the same as the reference signal pattern used in a current transmission occasions, in other words, in a case that the reference signal (such as the DMRS) pattern is not changed. That is, in order to reduce the overhead of the high-layer Radio Resource Control (RRC) signaling, the Medium Access Control (MAC) Control Element (CE) and/or the physical-layer Downlink Control Indicator (DCI) information caused by the dynamic change of the DMRS pattern, the system uses the most recent DMRS pattern for transmitting or receiving signals in a case that the high-layer RRC signaling, the MAC CE and/or the physical-layer DCI information does not exist, until a new high-layer RRC signaling, a new MAC CE and/or a new physical-layer DCI for indicating the change of the DMRS pattern is received. If the terminal device uses the k-th DMRS pattern to receive or transmit signals at a time t0, and the terminal device does not receive any one of the high-layer RRC signaling, the MAC CE or the physical-layer DCI information for indicating the change of the DMRS-pattern between time t0+1 and time t0+p, then the UE may receive and transmit signals using the k-th DMRS pattern from the time t0+1 to the time t0+p, until a new indication for indicating the change of the DMRS-pattern is received at time t0+p+1, and the UE stops using the k-th DMRS pattern.

Step 24: in a case that the target reference signal pattern satisfies a predefined condition, determining the reference signal indication information used for indicating the target reference signal pattern.

The predefined condition herein is a condition for transmitting the reference signal indication information. The predefined condition corresponds to a condition for not transmitting the reference signal indication information. The predefined condition is a condition that reference signal patterns other than the default reference signal pattern is to be used; or a condition that a reference signal pattern different from the reference signal pattern indicated by the previous piece of reference signal indication information is to be used. That is, in a case that the condition for not transmitting the reference signal indication information is a condition that the default reference signal pattern is used, the condition for transmitting the reference signal indication information is a condition that patterns other than the default reference signal pattern is used; or in a case that the condition for not transmitting the reference signal indication information is a condition that a reference signal pattern to be used is the same as the reference signal pattern used in the previous transmission occasions, the condition for transmitting the reference signal indication information is a condition that a reference signal pattern to be used is different from the reference signal pattern used in the previous transmission occasions.

Further, different DMRS patterns may correspond to different reference signal indication information; or different dynamic changes of the DMRS patterns correspond to different pieces of reference signal indication information. For example, a specific bit value in the reference signal indication information represents one of all DMRS patterns. Specifically, the reference signal indication information includes N bits, wherein $2^N$ is smaller than or equal to the number of the all reference signal patterns, and N is a positive integer. In a case that the $2^N$ is equal to the number of the all DMRS patterns, different values of the N bits represent different DMRS patterns. Further, for sake of reducing an overhead of bits in the reference signal indication information and saving transmission resources for the system, following manners may be used for the reference signal indication information to indicate the DMRS patterns.

A first manner: a first value represented by the N bits is used for indicating that the target reference signal pattern is a K-th reference signal pattern used in previous M transmission occasions, wherein the K is smaller than or equal to $2^N$; a second value represented by the N bits is used for indicating that the target reference signal pattern is not any of reference signal patterns used in the previous M transmission occasions.

The M transmission occasions is a window along a time axis, the window is dynamically changed with time elapsing. Furthermore, a configuration of the M is related to a value of the N. Generally, the larger the N is, the larger the M is. That is, the more the number of indication bits in the reference signal indication information is, types of patterns capable of being indicated are more, and the wider the window capable of being indicated is. Specific N bits exist in the reference signal indication information (the $2^N$ is smaller than the number of the all reference signal patterns, i.e., N is smaller than the number of bits needed for indicating all DMRS patterns). A first value represented by the N bits represents a K-th DMRS pattern used in one of the previous M transmission occasions closest to or farthest away from a current transmission occasion, wherein the K is smaller than or equal to $2^N$, a second value represented by the N bits represents any of the DMRS patterns used in previous transmission occasions is not used. For example, there are 16 DMRS patterns in all; if the reference signal indication information is directly used to indicate the patterns, four bits are need; in order to save the bit overhead of the system, three bits may be used, wherein seven values (such as 001-111) of all values represented by the three bits represent a first to a seventh DRMS patterns in previous seven transmission occasions are used respectively, a remaining value (such as 000) of the all values represented by the three bits represents any of the reference signal patterns used in the previous transmission occasions is not used. In this way, in a case that the seventh DMRS pattern used in previous transmission occasions is determined to be used in later transmission occasions, the network device determines that a value of the three bits in the reference signal indication information is correspondingly to be 111. If DMRS patterns used previously are used consistently, the above manner may be continuously used until any of the DMRS patterns used previously is not used any longer, the value of the three bits in the reference signal indication information is determined to be 000. Further, after any of the DMRS patterns used previously is determined to not be used any longer, a new DMRS pattern to be used may be indicated through other bit information. Thus, although any of the DMRS patterns used previously is not used any longer and more bits are needed to indicate the new DMRS pattern, an occurrence probability of this scene is relatively low since the M transmission occasions are continuously updated dynamically. Even if this scene occurs occasionally, significant bit overhead may not be generated. Therefore, indicating reference signal patterns in this way may reduce the bit overhead of system information to some extent and increase the service transmission rate. It should be noted that, a position of a field in which additional bits used for indicating the new reference signal (such as the DMRS) pattern is located is different from a position of a field in which the N bits used for indicating the dynamic change of the reference signal (such as the DMRS) patterns is located; or bearing information corresponding to the additional bits used for indicating the new reference signal (such as the DMRS) pattern is different from bearing information corresponding to the N bits used for indicating the dynamic change of the reference signal (such as the DMRS) patterns.

A second way: the reference signal indication information includes P bits. A value of the P bits is used to any one of $2^P$ different reference signal patterns.

That is, specific P bits (wherein $2^P$ is equal to the number of all reference signal patterns, P is equal to the number of bits needed for indicating the all DMRS patterns) in the reference signal indication information. Although the number of bits needed for this manner is the same as the number of bits in indication information in the related art, transmission times for the indication information are reduced in the present disclosure, and thus may save the bit overhead of the system to some extent.

Step 25: transmitting the reference signal indication information to the terminal device.

Since the network device may select a reference signal pattern corresponding to a service transmission scenario, the reference signal indication information capable of indicating a reference signal pattern to be used in later transmission occasions needs to be transmitted to the terminal device, so that the terminal device may obtain the reference signal pattern to be used in the later transmission occasions based on the reference signal indication information.

Step 25 specifically includes: transmitting the reference signal indication information to the terminal device by incorporating the reference signal indication information in the high-layer RRC signaling, the MAC CE or the physical-layer downlink control indicator (DCI) information.

That is to say, a change of DMRS patterns may be informed to the terminal device through the high-layer RRC signaling, the MAC CE and/or the physical-layer DCI information, i.e. N bits are added or specified in the high-layer RRC signaling, the MAC CE or the physical-layer DCI information to indicate the DMRS pattern to be used.

The network device provided in the embodiments of the present disclosure enables the terminal device to obtain the reference signal pattern to be used in the later transmission occasions, through transmitting the reference signal indication information used for indicating the reference signal pattern to be used in the later transmission occasions, so that the dynamic change of the reference signal patterns may be obtained accurately and therefore channel detection and channel measurement may be performed accurately and a service transmission performance may be ensured. Further, N bits are used in the reference signal indication information to indicated a K-th reference signal pattern used in previous transmission occasions, or any of the reference signal patterns used in the previous transmission occasions is not used; or M bits are used to indicate the reference signal pattern to be used, so as to reduce the bit overhead of the system information and increase the service transmission rate.

The reference signal indication method of the present disclosure is introduced above based on different scenarios through some embodiments. A network device corresponding to the reference signal indication method is further described hereinafter in combination the accompanying drawings and embodiments of the present disclosure.

Figure 3:
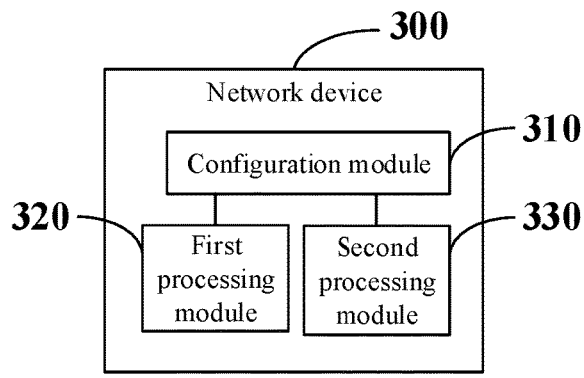
FIG. 3 is a structural schematic diagram of modules of a network device in some embodiments of the present disclosure.

As shown in FIG. 3, the network device 300 in the embodiments of the present disclosure may: configure the target reference signal pattern to be used in the later transmission occasions for the terminal device; in a case that the target reference signal pattern is the default reference signal pattern, not transmit the reference signal indication information to the terminal device; or in a case that the target reference signal pattern is the same as the reference signal pattern indicated by the previous piece of reference signal indication information, not transmit the reference signal indication information to the terminal device. The network device may implement details of the above reference signal indication method, and may achieve same technical effects. The target reference signal pattern is one selected from a plurality of predefined reference signal patterns. The network device 300 specifically includes following modules: a configuration module 310 configured to select a target reference signal pattern to be used for the terminal device in later transmission occasions, wherein the target reference signal pattern is one selected from the plurality of predefined reference signal patterns; a first processing module 320, configured to not transmit the reference signal indication information to the terminal device in a case that the target reference signal pattern is a default reference signal pattern; or a second processing module 330, configured to not transmit the reference signal indication information to the terminal device in a case that the target reference signal pattern is the same as a reference signal pattern indicated by a previous piece of reference signal indication information.

Figure 4:
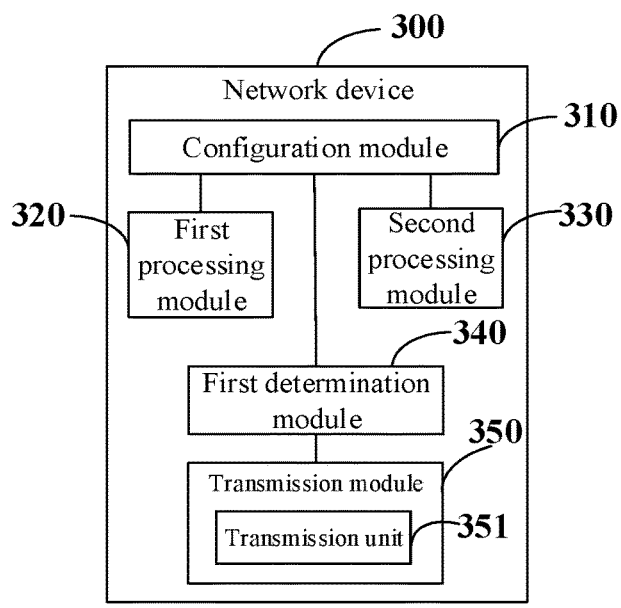
FIG. 4 is a structural schematic diagram of modules of the network device in some embodiments of the present disclosure.

As shown in FIG. 4, the network device 300 further includes a first determination module 340, configured to determine the reference signal indication information used to indicate the target reference signal pattern, in a case that the target reference signal pattern satisfies a predefined condition, wherein the predefined condition is a condition that reference signal patterns other than the default reference signal pattern is used; or the predefined condition is a condition that a reference signal pattern different from the reference signal pattern indicated by the previous piece of reference signal indication information is used; a transmission module 350, configured to transmit the reference signal indication information to the terminal device.

The transmission module 350 specifically includes: a transmission unit 351, configured to transmit the reference signal indication information to the terminal device by incorporating the reference signal indication information in the high-layer RRC signaling, the MAC CE or the physical-layer Downlink Control Indicator (DCI) information.

Specifically, the reference signal indication information includes N bits, wherein $2^N$ is smaller than or equal to the number of all reference signal patterns, and N is a positive integer.

A first value represented by the N bits is used for indicating that the target reference signal pattern is a K-th reference signal pattern used in previous M transmission occasions, wherein the K is smaller than or equal to $2^N$; a second value represented by the N bits is used for indicating the target reference signal pattern is not any of reference signal patterns used in the previous M transmission occasions.

The target reference signal pattern may be at least one of a Demodulation Reference Signal Pattern (DMRS pattern), a Channel-State-Information Reference Signal pattern (CSI-RS pattern), a Phase Tracking Reference Signal pattern (PTRS pattern), or a Sounding Reference Signal pattern (SRS pattern).

It should be noted that the reference signal indication method in the embodiments of the present disclosure is a method corresponding to the network device, and all implementations of the method and technical effects of the implementations are all applicable to the embodiment of the network device. The network device in the embodiments of the present disclosure does not transmit reference signal indication information in case of using the default reference signal pattern or using the same reference signal pattern as that used in the previous transmission occasions in the later transmission occasions, so that transmission times of system information is reduced under a premise that a reference signal pattern is indicated accurately, thereby reducing a bit overhead for the system information and increasing the service transmission rate.

In order to implement the above technical purpose in a better way, as shown in FIG. 3, some embodiments of the present disclosure further provide a network device. The network device includes a processor 500, a storage 520 connected to the processor 500 through a bus interface, and a transceiver 510 connected to the processor 500 through the bus interface. The storage 520 is used to store programs and data used when the processor executes operations; the transceiver 510 transmits data information or pilots, and receives a uplink control channel. When the processor 500 invokes and executes the programs and the data stored in the storage 520, the processor 500 is specifically used to perform following functions: configure a target reference signal pattern to be used in later transmission occasions for the terminal; in a case that the target reference signal pattern is the default reference signal pattern, not transmit reference signal indication information to the terminal device; or in a case that the target reference signal pattern is the same as a reference signal pattern indicated by a previous piece of reference signal indication information, not transmit the reference signal indication information to the terminal device. The target reference signal pattern is a reference signal pattern selected from a plurality of predefined reference signal patterns; the transceiver 510 is configured to transmit and receive data under a control of the processor 500, and is specifically configured to transmit the reference signal indication information to the terminal device.

Figure 5:
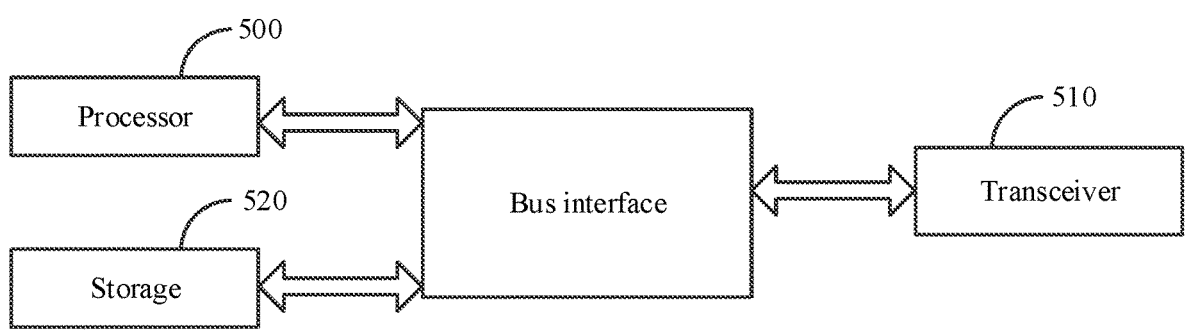
FIG. 5 is a structural block diagram of a network device in some embodiments of the present disclosure.

In FIG. 5, the bus interface may include any number of buses and bridges connected together. Specifically, a plurality of processors such as the processor 500 and a plurality of storages such as the storage 520 are connected together. The bus interface may also cause any other circuit such as a peripheral circuit, a voltage regulator and a power management circuit to be connected together. The circuits are known in the art, and thus detailed descriptions thereof are not further provided herein. The bus interface provides an interface. The transceiver 510 may include a plurality of elements such as receivers, transmitters, and units for communicating with other devices through a transmission medium. The processor 500 takes charge of managing the bus interface and general processings. The storage 520 may store data used by the processor 500 when the processor 500 performs operations.

The processor 500 is further configured to: in a case that the target reference signal pattern satisfies a predefined condition, determine the reference signal indication information used for indicating the target reference signal pattern; and control the transceiver 510 to transmit the reference signal indication information to the terminal device. The predefined condition is a condition that reference signal patterns other than the default reference signal pattern are used; or is a condition that a reference signal pattern different from the reference signal pattern indicated by the previous piece of reference signal indication information is used.

Specifically, the transceiver 510 is further configured to transmit the reference signal indication information to the terminal device by incorporating the reference signal indication information in the high-layer RRC signaling, the MAC CE or the physical-layer Downlink Control Indicator (DCI) information.

Specifically, the reference signal indication information includes N bits, wherein $2^N$ is smaller than or equal to the number of all reference signal patterns, and N is a positive integer.

A first value represented by the N bits is used for indicating that the target reference signal pattern is a K-th reference signal pattern used in previous M transmission occasions, wherein the K is smaller than or equal to $2^N$; a second value represented by the N bits is used for indicating that the target reference signal pattern is not any of reference signal patterns used in the previous M transmission occasions.

Further, the target reference signal pattern may be at least one of a Demodulation Reference Signal Pattern (DMRS pattern), a Channel-State-Information Reference Signal pattern (CSI-RS pattern), a Phase Tracking Reference Signal pattern (PTRS pattern), or a Sounding Reference Signal pattern (SRS pattern).

The network device in the embodiments of the present disclosure does not transmit the reference signal indication information to the terminal device in a case that the terminal device uses the default reference signal pattern or uses the same reference signal pattern as that used in the previous transmission occasions in the later transmission occasions, so that transmission times of system information are reduced under a premise that a reference signal pattern is indicated accurately, thereby reducing a bit overhead for the system information and increasing a service transmission rate.

The reference signal indication method of the present disclosure is introduced above from a perspective of the network device through some embodiments. The reference signal indication method at a terminal device side is further described hereinafter in combination the accompanying drawings and embodiments of the present disclosure.

Figure 6:
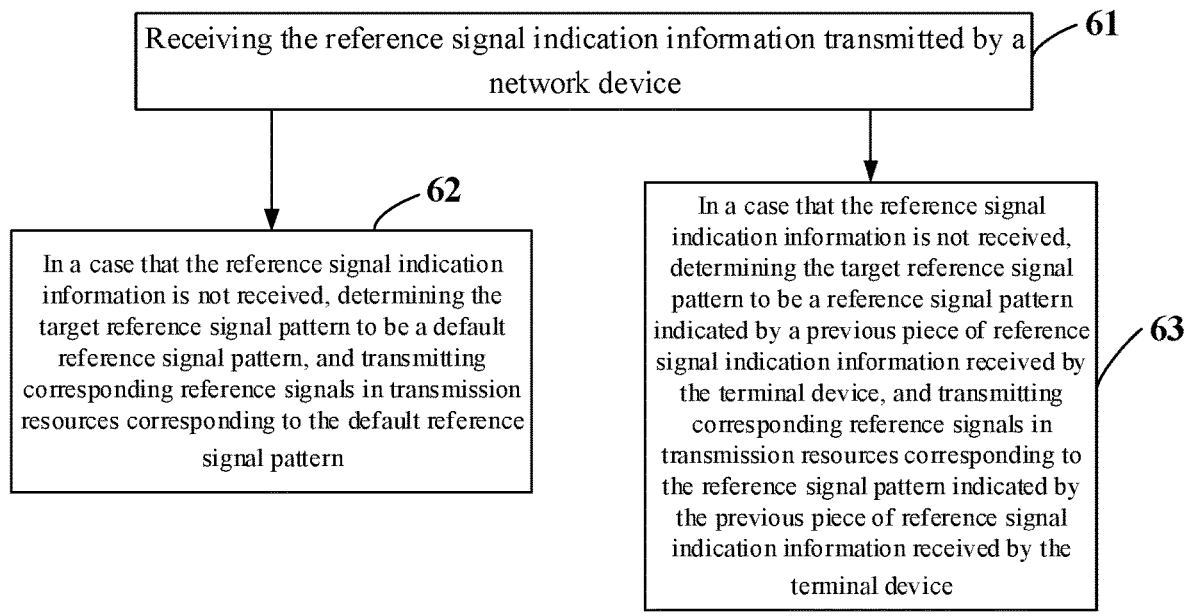
FIG. 6 is a flowchart of a reference signal indication method in some embodiments of the present disclosure.

Specifically, as shown in FIG. 6, the reference signal indication method provided in some embodiments of the present disclosure specifically includes following steps 61-63.

Step 61: receiving reference signal indication information transmitted by a network device.

The reference signal indication information is used to indicate a target reference signal pattern to be used in later transmission occasions.

In the forthcoming fifth-generation (5G) mobile communication system, in order to satisfy scene requirements such as different numerical configurations and dynamically-changed reference signal functions, reference signal patterns may be changed dynamically. Thus, in a scene having the same number of flows and the same beamforming, different reference signal patterns may also be designed. The network device needs to configure that different pieces of reference signal indication information corresponds to different reference signal patterns; or different dynamic changes of the reference signal patterns correspond to different pieces of reference signal indication information. The target reference signal pattern is a reference signal pattern selected from multiple predefined reference signal patterns.

Step 62: in a case that the reference signal indication information is not received, determining the target reference signal pattern to be a default reference signal pattern, and transmitting corresponding reference signals in transmission resources corresponding to the default reference signal pattern.

In order to reduce transmission times of the reference signal indication information, the network device does not transmit the reference signal indication information to the terminal device in case of using the default reference signal pattern. Thus, in a case that the reference signal indication information is not received by the terminal device, the terminal device determines that the network device uses the default reference signal pattern, and the terminal device transmits corresponding reference signals in transmission resources corresponding to the default reference signal pattern.

Step 63: in a case that the reference signal indication information is not received, determining the target reference signal pattern to be a reference signal pattern indicated by a previous piece of reference signal indication information received by the terminal device, and transmitting corresponding reference signals in transmission resources corresponding to the reference signal pattern indicated by the previous piece of reference signal indication information received by the terminal device.

In order to reduce transmission times of the reference signal indication information, the network device does not transmit the reference signal indication information to the terminal device in a case that the DMRS pattern is not changed. Thus, in a case that the reference signal indication information is not received by the terminal device, the terminal device determines that the network device uses the reference signal pattern indicated by the previous piece of reference signal indication information received by the terminal device, and corresponding reference signals are transmitted in transmission resources corresponding to the reference signal pattern indicated by the previous piece of reference signal indication information.

Further, the target reference signal pattern may be a Demodulation Reference Signal Pattern (DMRS pattern), a Channel-State-Information Reference Signal pattern (CSI-RS pattern), a Phase Tracking Reference Signal pattern (PTRS pattern), or a Sounding Reference Signal pattern (SRS pattern). The downlink reference signal patterns include the DMRS pattern, the CSI-RS pattern and the PTRS pattern; the uplink reference signal pattern includes the DMRS pattern, the SRS pattern and the PTRS pattern. The embodiment is illustrated by way of the DMRS pattern. After the terminal device receives the reference signal indication information, the terminal device analyzes the reference signal indication information, and obtains a DMRS pattern to be used, wherein different DMRS patterns are mapped to different transmission resources. After the terminal device obtains the DMRS pattern to be used, corresponding reference signals are transmitted through corresponding transmission resources. The transmission above includes downlink transmission and uplink transmission. Specifically, in a case that the reference signal pattern is the downlink reference signal pattern, the network device transmits downlink reference signals by using transmission resources corresponding to the downlink reference signal pattern; in a case that the reference signal pattern is the uplink reference signal pattern, the terminal device transmits the uplink reference signals by using transmission resources corresponding to the uplink reference signal pattern.

The network device in the embodiments of the present disclosure does not transmit the reference signal indication information in case of using the default reference signal pattern or using the same reference signal pattern as that used in the previous transmission occasions in the later transmission occasions; in a case that the terminal device fails to receive the reference signal indication information, the terminal device determines that the default reference signal pattern or the reference signal pattern used in the previous transmission occasions is to be used, and thus the bit overhead of the system information is reduced and a service transmission rate is increased under a premise that the reference signal pattern is accurately indicated.

A brief introduction is made to the reference signal indication method of the present disclosure through the above embodiments. The reference signal indication is further described hereinafter in combination accompanying drawings and specific application scenarios.

Figure 7:
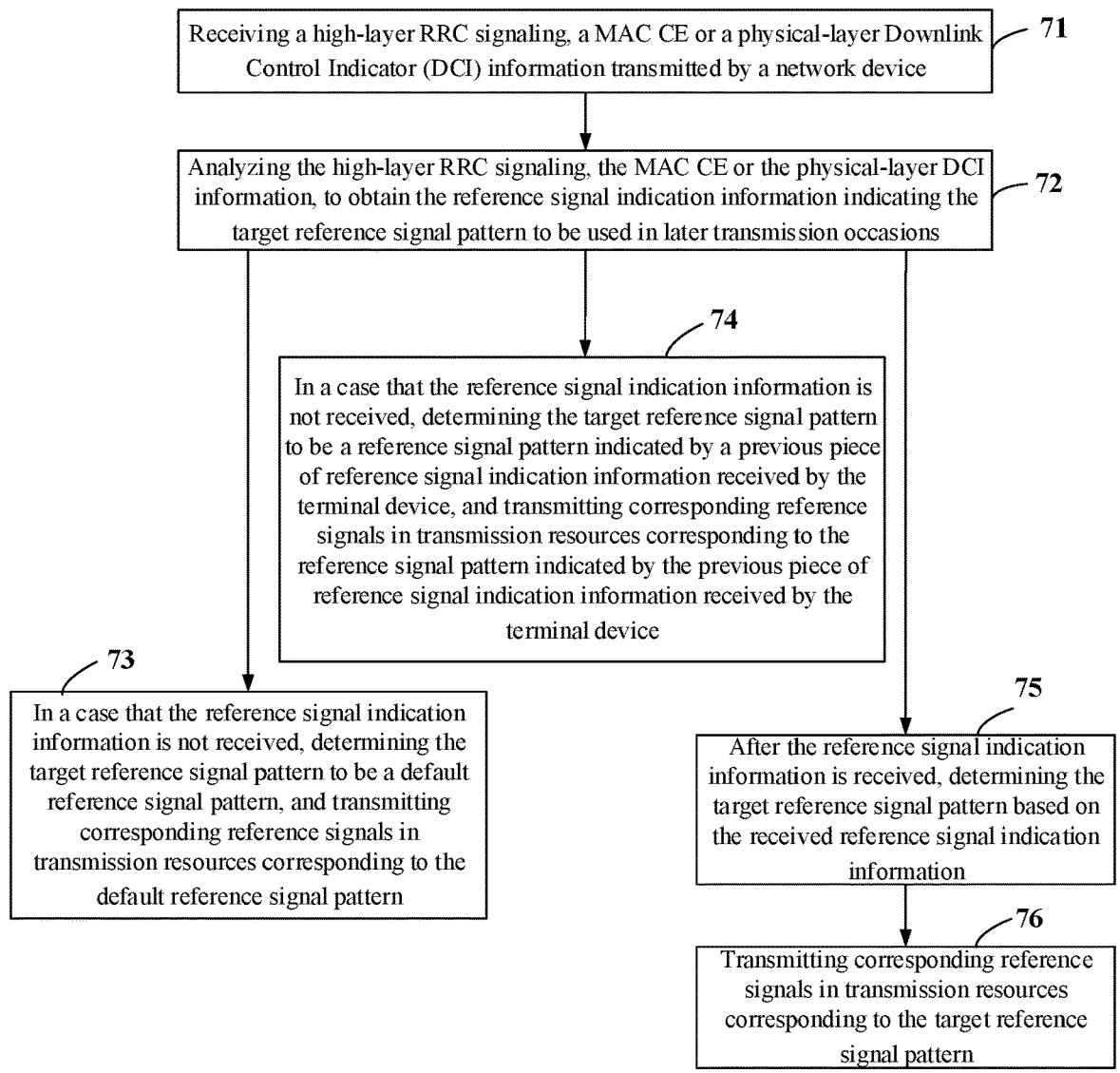
FIG. 7 is a flowchart of a reference signal indication method in some embodiments of the present disclosure.

Specifically, as shown in FIG. 7, the reference signal indication method provided in some embodiments of the present disclosure specifically includes following steps 71-76.

Step 71: receiving a high-layer RRC signaling, a MAC CE or a physical-layer Downlink Control Indicator (DCI) information transmitted by a network device.

A change of DMRS patterns may be informed to the terminal device through the high-layer RRC signaling, the MAC CE and/or the physical-layer DCI information by the network device, i.e. M bits or N bits are added or specified in the high-layer RRC signaling, the MAC CE or the physical-layer DCI information to indicate the DMRS pattern to be used.

Step 72: analyzing the high-layer RRC signaling, the MAC CE or the physical-layer DCI information, to obtain the reference signal indication information indicating the target reference signal pattern to be used in later transmission occasions.

The terminal device receives and analyzes the high-layer RRC signaling, the MAC CE or the physical-layer DCI information to obtain the added or the specified N bits, and to obtain the DMRS pattern to be used.

Step 73: in a case that the reference signal indication information is not received, determining the target reference signal pattern to be a default reference signal pattern, and transmitting corresponding reference signals in transmission resources corresponding to the default reference signal pattern.

In order to reduce transmission times of the reference signal indication information, the network device does not transmit the reference signal indication information to the terminal device in case of using the default reference signal pattern. Thus, in a case that the reference signal indication information is not received by the terminal device, the terminal device determines that the network device uses the default reference signal pattern, and transmits corresponding reference signals in transmission resources corresponding to the default reference signal pattern.

Step 74: in a case that the reference signal indication information is not received, determining the target reference signal pattern to be a reference signal pattern indicated by a previous piece of reference signal indication information received by the terminal device, and transmitting corresponding reference signals in transmission resources corresponding to the reference signal pattern indicated by the previous piece of reference signal indication information received by the terminal device.

Further, in order to reduce the transmission times of the reference signal indication information, the network device does not transmit the reference signal indication information to the terminal device in a case that the DMRS pattern is not changed. Thus, in a case that the reference signal indication information is not received by the terminal device, the terminal device determines that the network device transmits corresponding reference signals in transmission resources corresponding to the reference signal pattern indicated by the previous piece of reference signal indication information received by the terminal device.

Step 75: after the reference signal indication information is received, determining the target reference signal pattern based on the received reference signal indication information.

After the terminal device receives the reference signal indication information, the terminal device analyzes the reference signal indication information to obtain the DMRS pattern to be used. Specifically, the step includes analyzing the reference signal indication information to obtain N bits, wherein $2^N$ is smaller than or equal to the number of all reference signal patterns, N is a positive integer; in a case that a value represented by the N bits is the first value, determining that the target reference signal pattern is a K-th reference signal pattern used in previous M transmission occasions, wherein the K is smaller than or equal to $2^N$; in a case that the value represented by the N bits is the second value, determining that the target reference signal pattern is not any of reference signal patterns used in the previous M transmission occasions.

Step 76: transmitting corresponding reference signals in transmission resources corresponding to the target reference signal pattern.

Different DMRS patterns are mapped to different transmission resources. After the terminal device obtains the DMRS pattern to be used, corresponding reference signals are transmitted through corresponding transmission resources.

The network device in the embodiments of the present disclosure does not transmit the reference signal indication information in case of using the default reference signal pattern or using the same reference signal pattern as that used in the previous transmission occasions in the later transmission occasions; in a case that the terminal device fails to receive the reference signal indication information, the terminal device determines that the default reference signal pattern or the reference signal pattern used in the previous transmission occasions is to be used, and thus the bit overhead of the system information is reduced and the service transmission rate is increased. Further, the terminal device receives and analyzes the reference signal indication information transmitted by the network device and used to indicate the reference signal pattern to be used in the later transmission occasions, so that the terminal device obtains the reference signal pattern to be used in the later transmission occasions, thus the dynamic change of the reference signal patterns may be obtained accurately and therefore channel detection and channel measurement may be performed accurately and a service transmission performance may be ensured.

The reference signal indication method of the present disclosure is introduced above based on different scenarios through some embodiments. A terminal device corresponding to the reference signal indication method is further described hereinafter in combination the accompanying drawings.

Figure 8:
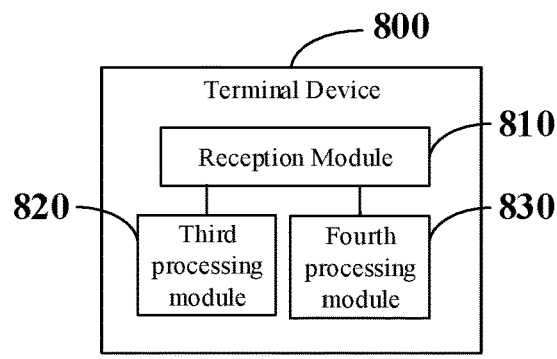
FIG. 8 is a schematic diagram of modules of a terminal device in some embodiments of the present disclosure.

As shown in FIG. 8, the terminal device 800 provided in the embodiments of the present disclosure may implement details in the embodiments of the above reference signal indication method applied to the terminal device and achieve same technical effects, the details include: receiving the reference signal indication information transmitted by the network device; in a case that the reference signal indication information is not received, determining the target reference signal pattern to be the default reference signal pattern, and transmitting corresponding reference signals in transmission resources corresponding to the default reference signal pattern; or in a case that the reference signal indication information is not received, determining the target reference signal pattern to be a reference signal pattern indicated by the previous piece of reference signal indication information received by the terminal device, and transmitting corresponding reference signals in transmission resources corresponding to the reference signal pattern indicated by the previous piece of reference signal indication information received by the terminal device. The reference signal indication information is used to indicate the target reference signal pattern to be used in later transmission occasions, the target reference signal pattern is one selected from multiple predefined reference signal patterns. The terminal device 800 includes following modules: a reception module 810, configured to receive the reference signal indication information transmitted by the network device, wherein the reference signal indication information is used to indicate a target reference signal pattern to be used in later transmission occasions, and the target reference signal pattern is a reference signal pattern selected from multiple predefined reference signal patterns; a third processing module 820, configured to, in a case that the reference signal indication information is not received, determine the target reference signal pattern to be the default reference signal pattern, and transmit corresponding reference signals in transmission resources corresponding to the default reference signal pattern; or a fourth processing module 830, configured to, in a case that the reference signal indication information is not received, determine the target reference signal pattern to be a reference signal pattern indicated by a previous piece of reference signal indication information received by the terminal device, and transmit corresponding reference signals in transmission resources corresponding to the reference signal pattern indicated by the previous piece of reference signal indication information received by the terminal device.

Figure 9:
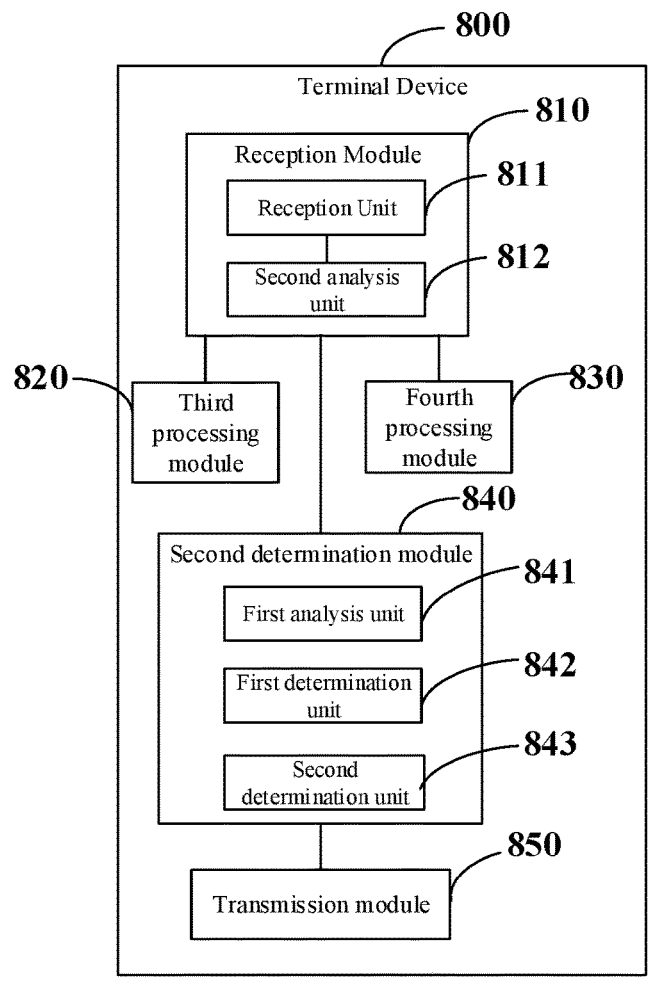
FIG. 9 is a schematic diagram of modules of the terminal device in some embodiments of the present disclosure.

As shown in FIG. 9, the terminal device 800 further includes: a second determination module 840, configured to, after receiving the reference signal indication information, determine the target reference signal pattern according to the received reference signal indication information; a transmission module 850, configured to transmit corresponding reference signals in transmission resources corresponding to the target reference signal pattern.

Specifically, the second determination module 840 includes: a first analysis unit 841, configured to analyze the reference signal indication information to obtain N bits, wherein $2^N$ is smaller than or equal to the number of all reference signal patterns, N is a positive integer; a first determination unit 842, configured to, in a case that a value represented by the N bits is the first value, determine that the target reference signal pattern is a K-th reference signal pattern used in previous M transmission occasions, wherein the K is smaller than or equal to $2^N$; a second determination unit 843, configured to, in a case that the value represented by the N bits is the second value, determine that the target reference signal pattern is not any of reference signal patterns used in the previous M transmission occasions.

The reception module 810 includes a reception unit 811, configured to receive a high-layer RRC signaling, a MAC CE or physical-layer Downlink Control Indicator (DCI) information transmitted by the network device; a second analysis unit 812, configured to analyze the high-layer RRC signaling, the MAC CE or the physical-layer DCI information, to obtain the reference signal indication information indicating the target reference signal pattern to be used in the later transmission occasions.

It should be noted that the terminal device in the embodiments of the present disclosure is a terminal device corresponding to the reference signal indication method applied to the terminal device and all implementations and technical effects of the method are all applicable to the embodiment of the terminal device. The network device in the embodiments of the present disclosure does not transmit the reference signal indication information in case of using the default reference signal pattern or using the same reference signal pattern as that used in the previous transmission occasions in the later transmission occasions; in a case that the terminal device fails to receive the reference signal indication information, the terminal device determines that the default reference signal pattern or the reference signal pattern used in the previous transmission occasions is to be used, and thus the bit overhead of the system information is reduced and a service transmission rate is increased under a premise that the reference signal pattern is accurately indicated.

Figure 10:
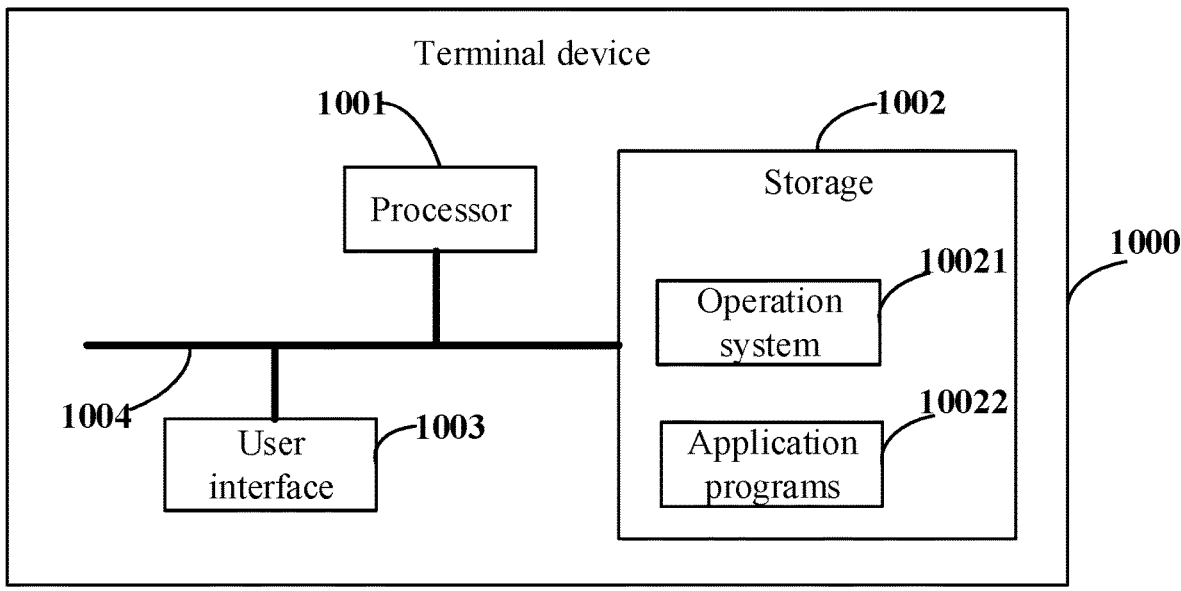
FIG. 10 is a block diagram of a terminal device in some embodiments of the present disclosure.

FIG. 10 is a block diagram of a terminal device 1000 in the embodiments of the present disclosure. As shown in FIG. 10, the terminal device includes at least one processor 1001, a storage 1002, and a user interface 1003. Various components of the terminal device 1000 are connected through a bus system 1004. It may be understood that the bus system 1004 is used to implement communication among the components. The bus system 1004 includes a data bus, a power bus, a control bus, and a status signal bus. However, for sake of clear illustration, all buses in FIG. 10 are marked as the bus system 1004.

The user interface 1003 may include a display, or a pointing device (such as a touch panel or a touch screen).

It may be understood that the storage 1002 in the embodiments of the present disclosure may be a volatile storage or a non-volatile storage, or may include both a volatile storage and a non-volatile storage. The non-volatile storage may be a Read-Only Memory (ROM), a Programmable ROM (PROM), an Erasable PROM (EPROM), an Electrically EPROM (EEPROM), or a flash memory. The volatile memory may be a Random Access Memory (RAM) which is used as an external cache. By way of example, not limited illustration, many forms of RAM may be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Sync link DRAM, SLDRAM), and a Direct Rambus RAM (DR-RAM).

The storage 1002 in the device and the method described in the present disclosure includes, but is not limited to, these or any other suitable types of storages.

In some embodiments, the storage 1002 stores following elements: executable modules or data structure, or subsets thereof, or expanded sets thereof: an operation system 10021 and application programs 10022.

The operation system 10021 includes various system programs, such as a frame layer, a core library layer, a driver layer, and the like, configured for implementing various basic services and processing hardware-based tasks. The application programs 10022 include various application programs, such as a Media Player, a Browser, configured for implement various application functions. Programs for implementing the method of the embodiments of the present disclosure may be included in the application programs 10022.

In the embodiments of the present disclosure, programs or instructions stored in the storage 1002 and being invoked may be programs or instructions stored in the application programs 10022. The processor 1001 is configured to receive the reference signal indication information transmitted by the network device; in a case that the reference signal indication information is not received, determine the target reference signal pattern to be a default reference signal pattern, and transmit corresponding reference signals in transmission resources corresponding to the default reference signal pattern; or in a case that the reference signal indication information is not received, determine the target reference signal pattern to be a reference signal pattern indicated by a previous piece of reference signal indication information received by the terminal, and transmit corresponding reference signals in transmission resources corresponding to the reference signal pattern indicated by the previous piece of reference signal indication information received by the terminal; wherein the reference signal indication information is used to indicate the target reference signal pattern to be used in later transmission occasions, and the target reference signal pattern is one selected from multiple predefined reference signal patterns.

The method disclosed in the embodiments of the present disclosure may be applied in the processor 1001, or be implemented by the processor 1001. The processor 1001 may be an integrated-circuit chip provided with a signal processing function. In the implementation, the steps of the method may be implemented by integrated circuits in the processor 1001 or implemented by instructions in a form of software. The processor 1001 may be a general processor, a Digital Signal Processor (DSP), an Application Specific Integrated Circuit (ASIC), a Field Programmable Gate Array (FPGA), or other programmable logic devices, discrete gates or transistor logic devices, discrete hardware components. The method, the steps and the logic blocks in the embodiments of the present disclosure may be implemented or executed by the processor. The general processor may be a microprocessor or may be any general processor. The steps of the method disclosed by the embodiments of the present disclosure may be embodied directly as hardware decoding processor, or implemented by a combination of hardware and software modules in the decoding processor. Software modules may be located in known storage mediums in the art such as a random access memory, a flash memory, a read only memory, a programmable read only memory or an electrically erasable and programmable memory and register. The storage medium is in the storage 1002, and the processor 1001 reads the information in the storage 1002 and completes the steps in the above method by combining the information with hardware in the processor 2401.

It may be understood that the embodiments of the present disclosure may be implemented by hardware, software, firmware, middleware, microcodes, or a combination thereof. In case of implementation through hardware, the processing units may be implemented in one or more Application Specific Integrated Circuits (ASIC), a Digital Signal Processor (DSP), a DSP Device (DSPD), a Programmable Logic Device (PLD), a Field Programmable Gate Array (FPGA), a general processor, a controller, a micro controller, a microprocessor, other electronic units capable of performing the function of the present disclosure, or a combination of the above.

In case of implementation through software, modules (such as processors, functions) capable of performing the functions of the present disclosure may be used to implement the techniques in the present disclosure. Software codes may be stored in the storage and executed by the processor. The storage may be implemented in a processor or implemented outside of the processor.

Specifically, the processor is further configured to: after the reference signal indication information is received, determine the target reference signal pattern based on the received reference signal indication information; transmit corresponding reference signals in transmission resources corresponding to the target reference signal pattern.

Specifically, the processor 1001 is further configured to analyze the reference signal indication information to obtain N bits, wherein $2^N$ is smaller than or equal to the number of all reference signal patterns, N is a positive integer; in a case that a value represented by the N bits is the first value, determine that the target reference signal pattern is a K-th reference signal pattern used in previous M transmission occasions, wherein the K is smaller than or equal to $2^N$; in a case that the value represented by the N bits is the second value, determine that the target reference signal pattern is not any of reference signal patterns used in the previous M transmission occasions.

Specifically, the processor 1001 is further configured to: receive the high-layer RRC signaling, the MAC CE or the physical-layer DCI information transmitted by the network device; analyze the high-layer RRC signaling, the MAC CE or the physical-layer DCI information, to obtain the reference signal indication information indicating the target reference signal pattern to be used in the later transmission occasions.

The network device in the embodiments of the present disclosure does not transmit the reference signal indication information in case of using the default reference signal pattern or using the same reference signal pattern as that used in the previous transmission occasions in the later transmission occasions; in a case that the terminal device fails to receive the reference signal indication information, the terminal device determines that the default reference signal pattern or the reference signal pattern used in the previous transmission occasions is to be used, and thus the bit overhead of the system information is reduced and the service transmission rate is increased under a premise that the reference signal pattern is accurately indicated.

Figure 11:
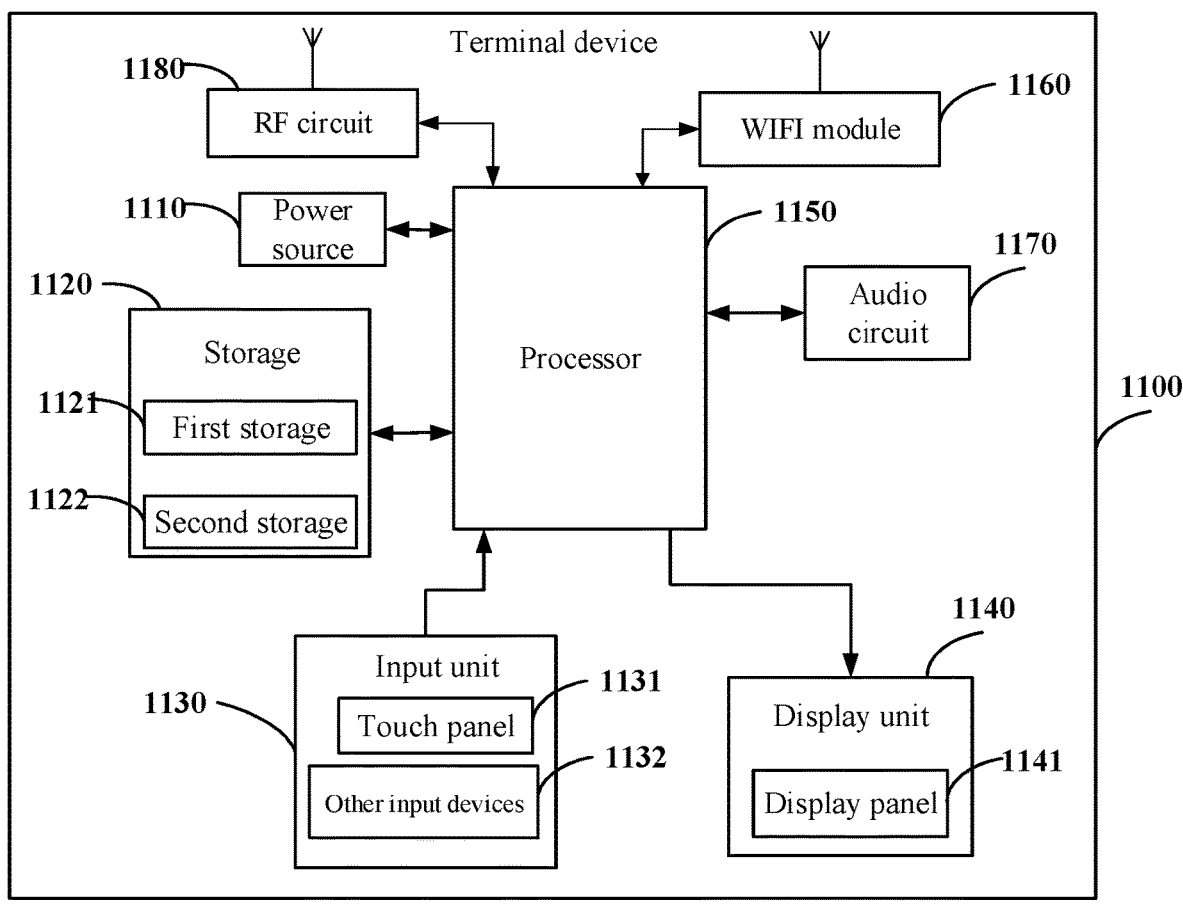
FIG. 11 is a block diagram of a terminal device in some embodiments of the present disclosure.

FIG. 11 is a structural schematic diagram of the terminal device provided in some other embodiments of the present disclosure. Specifically, the terminal device 1100 in FIG. 11 may be a mobile phone, a tablet, a Personal Digital Assistant (PDA), or an on-board computer.

The terminal device 1100 in FIG. 11 includes a power source 1110, a storage 1120, an input unit 1130, a display unit 1140, a processor 1150, a Wireless Fidelity (WIFI) module 1160, an audio circuit 1170, and a Radio Frequency (RF) circuit 1180.

The input unit 1130 may be configured to receive information inputted by a user, and generate signal inputs related with user settings and functional control of the terminal device 1100. Specifically, in the embodiments of the present disclosure, the input unit 1130 may include a touch panel 1131. The touch panel 1131, also called a touch screen, may collect touch operations made by a user (such as a user uses a finger, a stylus or any other suitable articles or attachments to touch the touch panel 1131) on the touch panel 1131 or near the touch panel 1131, and drive a corresponding connected device according to predetermined programs. Optionally, the touch panel 1131 may include a touch detection device and a touch controller. The touch detection device detects a touch position of a user and detects a signal from a touch operation, and transmits the signal to the touch controller; the touch controller receives touch information from the touch detection device, and transforms the touch information into touch position coordinates, and transmits the touch position coordinates to the processor 1150, and receives a command from the processor 1150 and executes the command. In addition, the touch panel 1131 may also be implemented in various types such as a resistive type, a capacitive type, an infrared ray type or a surface acoustic wave type. Beside the touch panel 1131, the input unit 1130 may further include other input devices 1132. The other input devices 1132 may include, but are not limited to, one or more of a physical keyboard, a functional key (such as a volume control key, a switch button, or the like), a track ball, a mouse, an operation stick, or the like.

The display unit 1140 may be used to display information inputted from a user or information provided to the user, and various menu interfaces of the terminal device. The display unit 1140 may include a display panel 1141. Optionally, the display panel 1141 may be configured by using a Liquid Crystal Display (LCD) or an Organic Light-Emitting Diode (OLED).

It should be noted that, the touch panel 1131 may cover the display panel 1141, and form a touch display screen together with the display panel 1141. When the touch display screen detects the touch operation on or near the touch display screen, the touch display screen transmits the touch operation to the processor 1150 to determine a type of a touch event, and thereby the processor 1150 provides a visual output on the touch display screen based on the type of the touch event.

The touch display screen includes an application interface display region and a common widget display region. An arrangement of the application interface display region and the common widget display region is not limited, and may be an arrangement capable of distinguishing the two display regions, such as an up-down arrangement, a left-right arrangement, or the like. The application interface display region may be used to display interfaces of applications. Each of the interfaces may include desktop elements such as an icon of at least one application and/or a widget desktop control. The application interface display region may also be an empty interface not containing contents. The common widget display region is used to display widgets used frequently, such as application icons including setting button, interface numbers, scroll bars, a phonebook icon, or the like.

The processor 1150 is a control center of the terminal device, and is connected to various parts of the mobile terminal through various interfaces and lines. Through executing or performing software programs and/or modules in the first storage 1121 and invoking data stored in the second storage 1122, the processor executes various functions and processes data for the terminal device, and thereby monitors comprehensively events of the terminal device. Optionally, the processor 1150 may include one or more processing units.

In the embodiments of the present disclosure, through invoking programs and/or modules stored in the first storage 1121 and/or data stored in the second storage 1122, the processor 1150 is configured to: receive the reference signal indication information transmitted by the network device; in a case that the reference signal indication information is not received, determine the target reference signal pattern to be a default reference signal pattern, and transmit corresponding reference signals in transmission resources corresponding to the default reference signal pattern; or in a case that the reference signal indication information is not received, determine the target reference signal pattern to be a reference signal pattern indicated by a previous piece of reference signal indication information received by the terminal device, and transmit corresponding reference signals in transmission resources corresponding to the reference signal pattern indicated by the previous piece of reference signal indication information received by the terminal device; wherein the reference signal indication information is used to indicate the target reference signal pattern to be used in later transmission occasions, and the target reference signal pattern is one selected from multiple predefined reference signal patterns.

Specifically, the processor 1150 is further configured to: after the reference signal indication information is received, determine the target reference signal pattern based on the received reference signal indication information; transmit corresponding reference signals in transmission resources corresponding to the target reference signal pattern.

Specifically, the processor 1150 is further configured to analyze the reference signal indication information to obtain N bits, wherein $2^N$ is smaller than or equal to the number of all reference signal patterns, N is a positive integer; in a case that a value represented by the N bits is the first value, determine that the target reference signal pattern is a K-th reference signal pattern used in previous M transmission occasions, wherein the K is smaller than or equal to $2^N$; in a case that the value represented by the N bits is the second value, determine that the target reference signal pattern is not any of reference signal patterns used in the previous M transmission occasions.

Specifically, the processor 1150 is further configured to: receive the high-layer RRC signaling, the MAC CE or the physical-layer DCI information transmitted by the network device; analyze the high-layer RRC signaling, the MAC CE or the physical-layer DCI information, to obtain the reference signal indication information indicating the target reference signal pattern to be used in the later transmission occasions.

The network device in the embodiments of the present disclosure does not transmit the reference signal indication information in case of using the default reference signal pattern or using the same reference signal pattern as that used in the previous transmission occasions in the later transmission occasions; in a case that the terminal device fails to receive the reference signal indication information, the terminal device determines that the default reference signal pattern or the reference signal pattern used in the previous transmission occasions is to be used, and thus the bit overhead of the system information is reduced and the service transmission rate is increased under a premise that the reference signal pattern is accurately indicated.

It may be understood by one of ordinary skills in the art, modules, algorithms, or steps described in the embodiments of present disclosure may be implemented by electronic hardware, computer software or a combination of the computer software and the electronic hardware. Whether the implementation is through the electronic hardware or through the computer software is determined by a specific application scenario and design constraints of technical solutions. Those skilled in the art may use different methods to implement the described modules or steps according to a specific application scenario, and such implementation does not go beyond the scope of the present disclosure.

One of ordinary skills in the art may clearly understand that, for sake of easy and brief description, a specific operation flow in the above-identified system, device and units may be obtained by referring to corresponding processes in the above process embodiments, and will not be repeated.

It should be understood that, in the several embodiments provided in the present disclosure, the disclosed device and method can be implemented in other ways. The apparatus embodiments described above are only illustrative. For example, a division of a unit may be only one logically functional division. There may be other divisions in actual implementations, e.g., multiple units and components can be combined or integrated in another system, or some features may be omitted or not executed. Additionally, couplings, or direct couplings, or communication connections between displayed or discussed components may be via some interfaces, indirect couplings or communication connections between devices or units, and may be electrical, mechanical or other forms of connections.

Modules or submodules described as separated parts may be integral or physically separated; parts displayed as modules may be or may not be physical units, may be located in the same place or be dispersed at multiple network units. Some or all of the modules described above may be used to implement the technical solution of the present disclosure according to actual requirements.

The functional units described in the embodiments of the present disclosure may be integrated in one processing unit or may be separated physically, or two or more of the units may be integrated in one unit.

The above functions of the present disclosure may be stored in a computer readable storage medium if they are implemented in forms of software functional modules or are sold or used as separate products. Based on such understandings, essentials of technical solutions of the embodiments of the present disclosure or parts that the present disclosure contributes to the relevant art, or a part of the technical solution of the present disclosure may be embodied in computer software products. The computer software products are stored in a storage medium including instructions for causing a computing device (which may be a personal computer, a server, a network device or the like) to perform some or parts of the method of the embodiments of the present disclosure. The above storage medium may include various medium capable of storing programs and codes such as a flash disk, a removable storage device, a ROM, a RAM, a magnetic disk or a compact disk.

It is further pointed out that modules or steps in the method or device in the present disclosure may be decomposed and/or recombined. Such decomposition and/or recombination also belong to equivalent technical solutions of the present disclosure. The steps in the above may be performed in the described sequence, but are not necessarily described in a chronological sequence. Some steps may be performed independently or concurrently. It should be understood by one skilled in the art that all or any of steps or components of the method and device in the present disclosure may be implemented in any computing device (including a processor, a storage, or the like) or in any network including computing devices, or implemented in hardware, firmware, software, or a combination thereof, after one skilled in the art reads the present disclosure and uses his basic programming skills.

Therefore, the present disclosure may be implemented by a program or a set of programs executed on any computing device. The computing device may be a general device known in the art. Therefore, an objective of the present disclosure may also be implemented by a program product including programs and codes for implementing the method or the device described above. That is, the program product also forms a part of the present disclosure, and a storage medium storing the program product also forms a part of the present disclosure. Obviously, the storage medium may be any storage medium known in the art or future storage medium to be developed. It is further pointed out that modules or steps in the method and device in the present disclosure may be decomposed and/or recombined. Such decomposition and/or recombination also should be viewed as equivalent technical solutions of the present disclosure. The steps in the above may be performed in the described sequence naturally, and are not necessarily performed in a chronological sequence. Some of the steps may be performed simultaneously or independently.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A reference signal indication method, applied to a network device side and comprising:
   configuring a target reference signal pattern for a terminal device, wherein the target reference signal pattern is a reference signal pattern selected from multiple predefined reference signal patterns;
   not transmitting reference signal indication information to the terminal device, in a case that the target reference signal pattern is a default reference signal pattern; and
   not transmitting the reference signal indication information to the terminal device, in a case that the target reference signal pattern is same as a reference signal pattern indicated by a previous piece of reference signal indication information.

2. The reference signal indication method according to claim 1, wherein after the configuring the target reference signal pattern for the terminal device, the method further comprises:
   in a case that the target reference signal pattern satisfies a predefined condition, determining the reference signal indication information used for indicating the target reference signal pattern, wherein, the predefined condition is a condition that reference signal patterns other than the default reference signal pattern is to be used, or the predefined condition is a condition that a reference signal pattern different from a reference signal pattern indicated by the previous piece of reference signal indication information is to be used;

transmitting the reference signal indication information to the terminal device.

3. The reference signal indication method according to claim 2, wherein the transmitting the reference signal indication information to the terminal device, comprises:

transmitting the reference signal indication information to the terminal device by incorporating the reference signal indication information in a high-layer Radio Resource Control (RRC) signaling, a Medium Access Control (MAC) Control Element (CE) or physical-layer Downlink Control Indicator (DCI) information.

4. The reference signal indication method according to claim 2, wherein, the reference signal indication information comprises N bits, $2^N$ is smaller than or equal to the number of all reference signal patterns, and N is a positive integer.

5. The reference signal indication method according to claim 4, wherein a first value represented by the N bits is used for indicating that the target reference signal pattern is a K-th reference signal pattern used in previous M transmission occasions, K is smaller than or equal to $2^N$;

a second value represented by the N bits is used for indicating that the target reference signal pattern is not any of reference signal patterns used in the previous M transmission occasions.

6. The reference signal indication method according to claim 1, wherein, the target reference signal pattern is at least one of a Demodulation Reference Signal pattern, a Channel-State-Information Reference Signal pattern, a Phase Tracking Reference Signal pattern, or a Sounding Reference Signal pattern.

7. The reference signal indication method according to claim 1, wherein, if the terminal device uses a k-th DMRS pattern to receive or transmit signals at a time t0, and the terminal device does not receive an indication for indicating change of the DMRS-pattern between time t0+1 and time t0+p, then the terminal device is capable of receiving and transmitting signals using the k-th DMRS pattern from the time t0+1 to the time t0+p, until a new indication for indicating the change of the DMRS-pattern is received at time t0+p+1, and the terminal device stops using the k-th DMRS pattern.

8. The reference signal indication method according to claim 1, wherein, the reference signal indication information comprises P bits, and a value of the P bits is used to any one of $2^P$ different reference signal patterns.

9. A reference signal indication method, applied to a terminal device and comprising:

receiving reference signal indication information transmitted by a network device, wherein the reference signal indication information is used to indicate a target reference signal pattern for the terminal device, and the target reference signal pattern is a reference signal pattern selected from multiple predefined reference signal patterns;

in a case that the reference signal indication information is not received, determining a default reference signal pattern as target reference signal pattern, and transmitting corresponding reference signals in transmission resources corresponding to the default reference signal pattern;

in a case that the reference signal indication information is not received and a reference signal pattern indicated by a previous piece of reference signal indication information is received by the terminal device, determining, as the target reference signal pattern, the reference signal pattern indicated by the previous piece of reference signal indication information received by the terminal device, and transmitting corresponding reference signals in transmission resources corresponding to the reference signal pattern indicated by the previous piece of reference signal indication information received by the terminal device.

10. The reference signal indication method according to claim 9, wherein, after the receiving reference signal indication information transmitted by the network device, the method further comprises:

after receiving the reference signal indication information, determining the target reference signal pattern based on the received reference signal indication information;

transmitting corresponding reference signals in transmission resources corresponding to the target reference signal pattern.

11. The reference signal indication method according to claim 10, wherein, the determining the target reference signal pattern based on the received reference signal indication information, comprises:

analyzing the reference signal indication information to obtain N bits, wherein $2^N$ is smaller than or equal to the number of all reference signal patterns, N is a positive integer;

in a case that a value represented by the N bits is a first value, determining that the target reference signal pattern is a K-th reference signal pattern used in previous M transmission occasions, wherein K is smaller than or equal to $2^N$;

in a case that the value represented by the N bits is a second value, determining that the target reference signal pattern is not any of reference signal patterns used in the previous M transmission occasions.

12. The reference signal indication method according to claim 9, wherein, the receiving reference signal indication information transmitted by a network device, comprises:

receiving a high-layer Radio Resource Control (RRC) signaling, a Medium Access Control (MAC) Control Element (CE) or physical-layer Downlink Control Indicator (DCI) information transmitted by the network device;

analyzing the high-layer RRC signaling, the MAC CE or the physical-layer DCI information, to obtain the reference signal indication information indicating the target reference signal pattern for the terminal device.

13. The reference signal indication method according to claim 9, wherein, the reference signal indication information comprises P bits, and a value of the P bits is used to any one of $2^P$ different reference signal patterns.

14. A network device, comprising:

a configuration circuit, configured to select a target reference signal pattern for a terminal device, wherein the target reference signal pattern is a reference signal pattern selected from multiple predefined reference signal patterns;

a first processing circuit, configured to not transmit reference signal indication information to the terminal device in a case that the target reference signal pattern is a default reference signal pattern; and a second processing circuit, configured to not transmit the reference signal indication information to the terminal device in a case that the target reference signal pattern is the same as a reference signal pattern indicated by a previous piece of reference signal indication information.

15. The network device according to claim 14, further comprising:
a first determination circuit, configured to determine the reference signal indication information used to indicate the target reference signal pattern, in a case that the target reference signal pattern satisfies a predefined condition, wherein the predefined condition is a condition that reference signal patterns other than the default reference signal pattern is to be used, or the predefined condition is a condition that a reference signal pattern different from a reference signal pattern indicated by the previous piece of reference signal indication is to be used;
a transmission circuit, configured to transmit the reference signal indication information to the terminal device.

16. The network device according to claim 14, wherein, the transmission circuit comprises:
a transmission sub-circuit, configured to transmit the reference signal indication information to the terminal device by incorporating the reference signal indication information in a high-layer Radio Resource Control (RRC) signaling, a Medium Access Control (MAC) Control Element (CE) or physical-layer Downlink Control Indicator (DCI) information.

17. The network device according to claim 14, wherein, the reference signal indication information comprises N bits, $2^N$ is smaller than or equal to the number of all reference signal patterns, and N is a positive integer.

18. The network device according to claim 17, wherein, a first value represented by the N bits is used for indicating that the target reference signal pattern is a K-th reference signal pattern used in previous M transmission occasions, K is smaller than or equal to $2^N$;
a second value represented by the N bits is used for indicating that the target reference signal pattern is not any of reference signal patterns used in the previous M transmission occasions.

19. The network device according to claim 14, wherein, the target reference signal pattern is at least one of a Demodulation Reference Signal pattern, a Channel-State-Information Reference Signal pattern, a Phase Tracking Reference Signal pattern, or a Sounding Reference Signal pattern.

20. The network device according to claim 14, wherein, the reference signal indication information comprises P bits, and a value of the P bits is used to any one of $2^P$ different reference signal patterns.

* * * * *